United States Patent
Beesley et al.

(10) Patent No.: US 12,180,900 B2
(45) Date of Patent: Dec. 31, 2024

(54) METHOD OF CONTROLLING A COMBUSTOR

(71) Applicant: Siemens Energy Global GmbH & Co. KG, Munich (DE)

(72) Inventors: Brian Beesley, Lincoln (GB); Ghenadie Bulat, Lincoln (GB)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 18/254,865

(22) PCT Filed: Nov. 26, 2021

(86) PCT No.: PCT/EP2021/083221
§ 371 (c)(1),
(2) Date: May 29, 2023

(87) PCT Pub. No.: WO2022/117465
PCT Pub. Date: Jun. 9, 2022

(65) Prior Publication Data
US 2024/0301835 A1    Sep. 12, 2024

(30) Foreign Application Priority Data
Dec. 1, 2020  (GB) .................................... 2018928

(51) Int. Cl.
*F02C 9/28* (2006.01)
*F02C 7/228* (2006.01)

(52) U.S. Cl.
CPC ............. *F02C 9/28* (2013.01); *F02C 7/228* (2013.01); *F05D 2240/35* (2013.01); *F05D 2270/095* (2013.01); *F05D 2270/31* (2013.01)

(58) Field of Classification Search
CPC ...... F02C 7/228; F05D 2270/31; F23R 3/343; F23R 3/346
See application file for complete search history.

(56) References Cited

U.S. PATENT DOCUMENTS

| 2009/0217672 A1* | 9/2009 | Bulat | ............... F23N 5/242 431/12 |
| 2012/0196234 A1* | 8/2012 | Bulat | ............... F23N 5/16 431/13 |
| 2019/0101062 A1 | 4/2019 | Vise et al. | |

FOREIGN PATENT DOCUMENTS

| EP | 2486328 B1 | 7/2013 |
| EP | 1974139 B1 | 8/2018 |

(Continued)

OTHER PUBLICATIONS

PCT International Search Report and Written Opinion of International Searching Authority mailed Mar. 30, 2022 corresponding to PCT International Application No. PCT/EP2021/083221 filed Nov. 26, 2021.

(Continued)

*Primary Examiner* — Scott J Walthour

(57) ABSTRACT

A method of controlling a combustor of a gas turbine engine, the method comprising the steps
  supplying a total fuel quantity to the combustor dependent on a load of the gas turbine engine, the total fuel quantity is split into a pilot fuel quantity and a main fuel quantity via a scheduled pilot fuel split, the pilot fuel split is the percentage of the pilot fuel quantity of the total fuel quantity,
  monitoring combustion instability,
  applying a steady state active pilot split offset to the scheduled pilot fuel split when a predetermined temperature of the combustor is exceeded and/or a predetermined value of combustion instability is exceeded to create a steady state pilot fuel split,
  monitoring a condition of the gas turbine engine that influences an air/fuel ratio in the combustor,
  disabling the steady state active pilot split offset when the condition of the gas turbine engine is indicative of a (Continued)

transient condition and when a threshold value of combustion instability is exceeded, and applying a transient active pilot split offset to the steady state pilot fuel split while maintaining the total fuel quantity being supplied at any point in time, the transient active pilot split offset and the steady state active pilot split offset result in a total split offset, the total split offset being greater than the steady state active pilot split offset and the rate of change of the transient active pilot split offset is faster than the rate of change of the steady state active pilot split offset.

32 Claims, 5 Drawing Sheets

(56) References Cited

FOREIGN PATENT DOCUMENTS

| | | |
|---|---|---|
| WO | 2007082608 A1 | 7/2007 |
| WO | 2011042037 A1 | 4/2011 |

OTHER PUBLICATIONS

GB Application No. 2018928.8 filed on Dec. 1, 2020, Search Report dated May 28, 2021.

\* cited by examiner

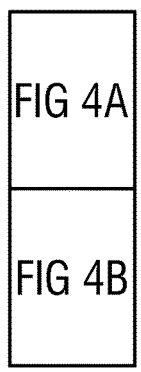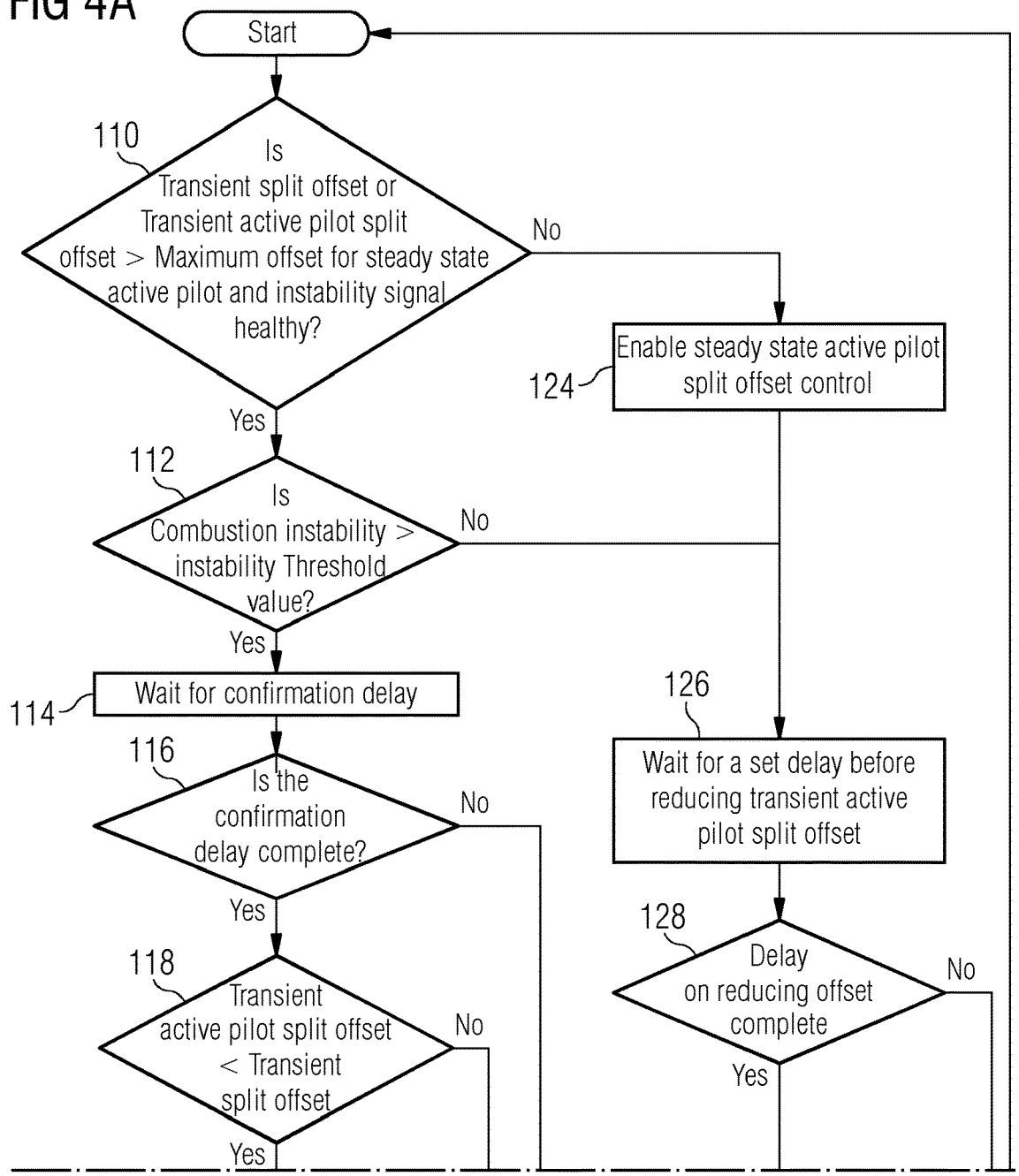

METHOD OF CONTROLLING A COMBUSTOR

FIELD OF INVENTION

The present invention relates to a method of controlling a combustion system of a gas turbine engine and in particular a method of controlling the combustion system to improve reliability and/or reduce emissions during transient conditions of the gas turbine engine.

BACKGROUND OF INVENTION

In a gas turbine engine, fuel is introduced within the combustion chamber from multiple injection points using multiple fuel supply lines. Normally, the fuel will be fed through different fuel supply lines for primary or pilot fuel and main fuel. Within the combustion chamber a pilot flame and a main flame are distinct although interact as is well known to provide flame stability. The main flame has a relatively high air to fuel ratio and is a lean burn flame giving good efficiency and low emissions. The pilot flame has a lower air to fuel ratio and burns in a richer flame. The pilot flame is more stable than the main flame and helps to stabilise the main flame. The split or ratio of the total fuel into pilot and main fuels is controlled by the Engine Control Unit via a number of controllable valves. The quantity of the total fuel supplied to each of the pilot and main fuel injector is scheduled dependent on gas turbine engine load.

Although the total quantity of fuel is split into a pilot fuel quantity and a main fuel quantity and which has a pilot to main fuel split; usually the fuel split is referred to as a pilot fuel split, which is the split or percentage of pilot fuel quantity to total fuel quantity. In general, at higher engine loads proportionally more fuel is supplied to the main fuel injectors, resulting in a low pilot fuel split, and at lower engine loads proportionally more fuel is supplied to the pilot fuel injectors, resulting in a high pilot fuel split. Conventionally, the pilot fuel split is scheduled dependent on the gas turbine engine's load.

Changes in engine load, calorific values of fuel and ambient conditions can give rise to combustion instability. This combustion instability can cause increased harmful emissions, increased temperature of components, pressure fluctuations that are detrimental to structural integrity and flame blow-out. These are all clearly undesirable effects of combustion instability.

EP1974139B1 discloses an active modulation of the pilot fuel split and is designed to adapt to variations in conditions experienced during steady state operation i.e. constant load demand. Such variations in conditions comprise ambient temperature, manufacturing tolerances and specific site demands. However, this active modulation is set at conservative levels with respect to limiting emissions to ensure full operability, particularly managing combustion instability, of the combustor. The method of EP1974139B1 is termed active pilot herein.

EP2486328B1 discloses a control arrangement that is arranged to vary the split of main and pilot fuel supplies, i.e. via controlling the pilot fuel split, to a combustor via a signal based on temperature and pressure of the combustor and on progress over time. The control arrangement is further configured such that the signal also represents a load information being indicative of a load of the combustion apparatus. The control arrangement is intended to maintain the temperature of the combustor below a predetermined maximum temperature limit and to keep the pressure variations within the combustion volume below a predetermined maximum pressure variation limit, while keeping the overall fuel supply in the fuel supply line to the apparatus substantially constant. The control arrangement of EP2486328B1 is termed as Intelligent control.

The methods of controlling fuel splits disclosed in EP1974139B1 and EP2486328B1, alone or in combination, provide good combustion operability and low emissions at steady state conditions. However, there is a constant desire to further improve combustion operability, reliability and reduce emissions even further.

SUMMARY OF INVENTION

The present invention has at least the following objectives, particularly during transient engine conditions, to decrease the time taken to apply an offset to the pilot fuel split, increase the rate of applying the offset to the pilot fuel split, improve combustor dynamics and reduce pressure fluctuations in the combustion chamber, improve combustion stability and limit combustion component temperatures, to reduce the effect of transient combustion instability from on steady state emissions of the gas turbine engine and particularly NOX. Furthermore, the present invention reduces detrimental effect on emissions in steady state operation for a period following transient events and can reduce instability or flame failure events during load transients or recovery from load transients.

The above objects are achieved by a method of controlling a combustor of a gas turbine engine, the method comprising the steps:
  supplying a total fuel quantity to the combustor dependent on a load of the gas turbine engine, the total fuel quantity being split into a pilot fuel quantity and a main fuel quantity via controlling a scheduled pilot fuel split. The scheduled pilot fuel split is a scheduled split of fuel to the pilot and main fuel supplies. The scheduled pilot fuel split is the initial split in the total fuel being supplied during steady state operation for minimising emissions and maximising efficiency in ideal and stable conditions. Here the main flame is burning as lean as possible, i.e., as high an air/fuel ratio as possible, with minimum pilot flame to ensure combustion stability. The pilot flame burns more richly than the main flame, in other words the pilot flame has a lower air/fuel ratio. The pilot fuel split being the split of the pilot fuel quantity to the total fuel quantity.
  monitoring combustion instability.
  applying a steady state active pilot split offset to the pilot fuel split to create a steady state pilot fuel split, the steady state active pilot split offset being adjusted automatically when a predetermined temperature of the combustor is exceeded and/or a predetermined value of combustion instability is exceeded.
  monitoring a condition of the gas turbine engine that influences an air/fuel ratio in the combustor,
  disabling adjustment of the steady state active pilot split offset when the condition of the gas turbine engine is indicative of a transient condition and when a threshold value of combustion instability is exceeded, and
  applying a transient active pilot split offset to the steady state pilot fuel split while maintaining the total fuel quantity being supplied at any point in time, the transient active pilot split offset and the steady state active pilot split offset result in a total split offset,
  the total split offset is greater than the steady state active pilot split offset and the rate of change of the transient active pilot split offset is faster than the rate of change of the steady state active pilot split offset. In other words, the rate of change of the transient active pilot split offset is faster than the rate of change of the steady state active pilot split offset had the steady state active pilot split offset remained active.

The threshold value of combustion instability for transient active pilot split offset and the predetermined value for the steady state active pilot split offset are implemented as separate values even if they are both set to the same actual value. This will allow tuning of the transient condition response to a higher or lower value where necessary to improve combustion stability without affecting steady state emissions control.

The following should be noted:
the steady state pilot fuel split is the sum of scheduled pilot fuel split and the steady state active pilot split offset;
the pilot fuel split is the sum of the steady state pilot fuel split and the transient active pilot split offset;
the scheduled pilot fuel split is not disabled at any point. It is only adjustment of the steady state active pilot split offset that occurs, not complete removal of the offset, the method stops adjusting this steady state offset for combustion instability/to reduce emissions or for high combustor temperature, for example, burner tip temperature;
the steady state split offset is modulated in response to high combustor temperature or combustion instability and the steady state offset is always present.

Preferably, when the condition of the gas turbine engine is indicative of a steady-state condition or when combustion instability is below the predetermined value of combustion instability, the transient active pilot split offset reduces to zero and adjustment of the steady state active pilot split offset is re-enabled to adjust the pilot fuel split while maintaining the total fuel quantity being supplied at any point in time.

The condition of the gas turbine engine that influences an air/fuel ratio in the combustor may be any one or more of the group a position of a variable guide vane, a position of a blow-off valve, a position of a bleed valve, a fuel energy input rate, a rotational speed demand of the engine, a load demand value.

The pilot fuel split with the steady state active pilot split offset and/or the transient active pilot split offset applied may have a maximum value in the range 2% to 85%, preferably in the range 40% to 85%, more preferably in the range 60% to 65%.

The scheduled pilot fuel split may be in the range 2% to 80%, preferably in the range 5% to 25%, and more preferably in the range 5% to 15%.

The steady state active pilot split offset may be in the range −5% to 5%, preferably in the range −2% to 2%.

The transient active pilot split offset may be in the range 0.01% to 25% when combustion instability is above the threshold value, preferably in the range 1% to 25%, more preferably in the range 2% to 10%.

By applying a transient active pilot split offset to the scheduled pilot fuel split while maintaining the total fuel quantity being supplied at any point in time, the transient active pilot split offset may cause the pilot fuel split to be in the range 2% to 80%, preferably in the range 5% to 15%.

The transient active pilot split offset is applied at a rate in the range 0.1% to 5% per second, preferably at a rate in the range 0.5% to 1.0% per second.

When combustion instability exceeds the threshold value, there is a confirmation delay before overriding the steady state active pilot split offset control and applying a transient active pilot split offset to the pilot fuel split while maintaining the total fuel quantity being supplied at any point in time, the confirmation delay is in the range 0.1-10 millibar-seconds, preferably 4-5 millibar-seconds, and the confirmation delay is an inverse error-time delay where the delay reduces with increasing overshoot beyond the threshold value.

The threshold value for combustion instability may be the amplitude of the fluctuations in pressure in a set frequency band of combustion. The threshold value of combustion instability may be a value between 15 and 50 millibars, preferably between 24 and 34 millibars.

The method comprises the step of setting a ramp off delay before reducing the transient active pilot split offset when the combustion instability is below the threshold value. Preferably, this step occurs when the combustion instability is below the threshold value after having been above it.

The ramp off delay may be a value between 0.1 and 5 seconds, preferably 2 to 3 seconds.

The method comprises the step of reducing the transient active pilot split offset at a fast ramp off rate while the transient active pilot fuel split remains above a slow ramp off rate enable threshold, and/or reducing the transient active pilot split offset at a slow ramp off rate when the transient active pilot split offset is below the slow ramp off rate enable threshold.

The fast ramp off rate may be in the range 0.1%-5% per second, preferably in the range 0.5%-1.0% per second.

The slow ramp off rate may be in the range 0.01%-1% per second, preferably in the range 0.2%-0.3% per second.

The slow ramp off rate enable threshold may be a value in the range 1%-10%, preferably 2%-5%.

The method may comprise the step enabling the steady state active pilot split when both the transient active pilot split offset and the transient split offset for the transient condition are no longer above the maximum amount for the steady state active pilot split.

BRIEF DESCRIPTION OF THE DRAWINGS

The above-mentioned attributes and other features and advantages of the present technique and the manner of attaining them will become more apparent and the presently disclosed combustor and method of operation will be better understood by reference to the following description of embodiments of the present technique taken in conjunction with the accompanying drawings, wherein.

DETAILED DESCRIPTION OF INVENTION

Figure 1:
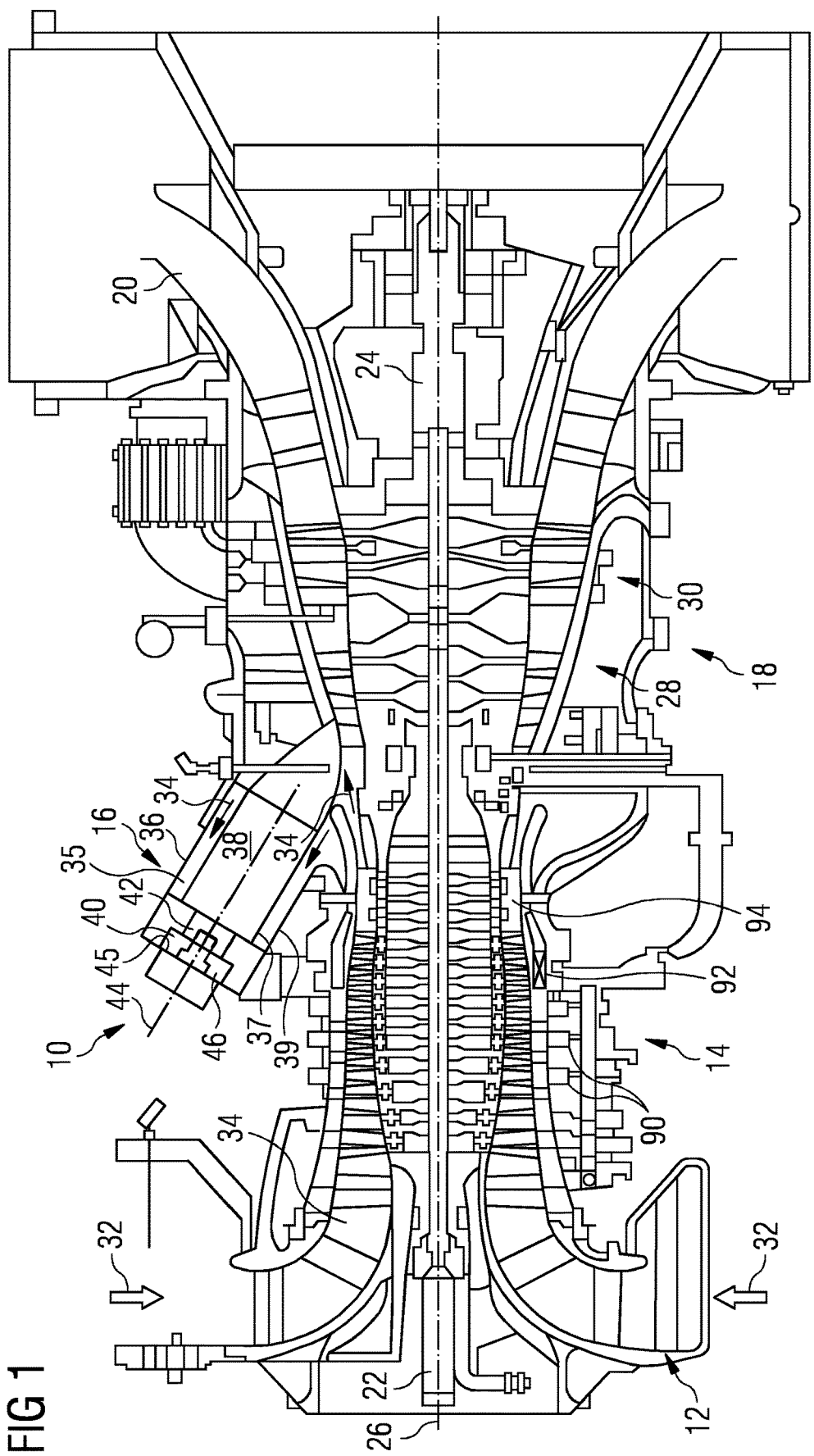
FIG. 1 shows part of a turbine engine in a sectional view and in which the present combustion system is incorporated and in accordance with the present disclosure.

FIG. 1 is a schematic and sectional illustration of a general arrangement of a turbine engine 10 having an inlet 12, a compressor 14, a combustor system 16, a turbine system 18, an exhaust duct 20 and a twin-shaft arrangement 22, 24. The turbine engine 10 is generally arranged about an axis 26 which for rotating components is their rotational axis. The shafts of the twin-shaft arrangement 22, 24 may have the same or opposite directions of rotation. The combustor system 16 comprises an annular array of combustors or combustor cans 36, only one of which is shown. In one example, there are six combustors 36 evenly spaced about the engine 10. The turbine system 18 includes a high-pressure turbine 28 drivingly connected to the compressor 14 by a first shaft 22 of the twin-shaft arrangement. The turbine system 18 also includes a low-pressure turbine 30 drivingly connected to a load (not shown) via the second shaft 24 of the twin-shaft arrangement.

The terms radial, circumferential and axial are with respect to the engine's rotational axis 26 or as otherwise stated for example with reference to a combustor axis 44. The terms upstream and downstream are with respect to the general direction of gas flow through the engine and, as seen in FIG. 1, is generally from left to right.

The compressor 14 comprises an axial series of stator vanes and rotor blades mounted in a conventional manner. The stator or compressor vanes may be fixed or have variable geometry to improve the airflow onto the downstream rotor or compressor blades as is well known. Each turbine 28, 30 comprises an axial series of stator vanes and rotor blades. The stator vanes can be mounted to a radially outer casing or a radially inner drum. The rotor blades are mounted via rotor discs arranged and operating in a conventional manner. A rotor assembly comprises an annular array of rotor blades or blades and the rotor disc. Each combustor 36 is constructed from two walls, an inner wall 37 and an outer wall 39, between which is defined a generally annular space or plenum 35. At the head of the combustor 36 is a radial swirler 40 which comprises a swirl plate or base plate 45, an annular array of swirler vanes 46 and fuel injection points as will be described in more detail later. The swirler 40 is succeeded by a pre-chamber 42 and then a main combustion chamber 38. These combustor 36 components are generally arranged about the combustor axis 44. The annular array of swirler vanes 46 define swirler slots 47, arranged around the base plate 45.

In operation, air 32 is drawn into the engine 10 through the inlet 12 and into the compressor 14 where the successive stages of vanes and blades compress the air before delivering the compressed air 34 into the combustor system 16. The compressed air 34 flows through the plenum 35 and into the swirler 40. The swirler 40 creates highly turbulent air into which the fuel is injected. The air/fuel mixture is delivered into the pre-chamber 42, where mixing continues, and then into the main combustion chamber 38. In the combustion chamber 38 the mixture of compressed air and fuel is ignited and burnt. The resultant hot working gas flow is directed into, expands and drives the high-pressure turbine 28 which in turn drives the compressor 14 via the first shaft 22. After passing through the high-pressure turbine 28, the hot working gas flow is directed into the low-pressure turbine 30 which drives the load via the second shaft 24.

The low-pressure turbine 30 can also be referred to as a power turbine and the second shaft 24 can also be referred to as a power shaft. The load is typically an electrical machine for generating electricity or a mechanical machine such as a pump or a process compressor. Other known loads may be driven via the low-pressure turbine. The fuel may be in gaseous and/or liquid form.

The turbine engine 10 shown and described with reference to FIG. 1 is just one example of a number of engines or turbomachinery in which this invention can be incorporated. Such engines can be gas turbines or steam turbine and include single, double and triple shaft engines applied in marine, industrial and aerospace sectors.

Figure 2:
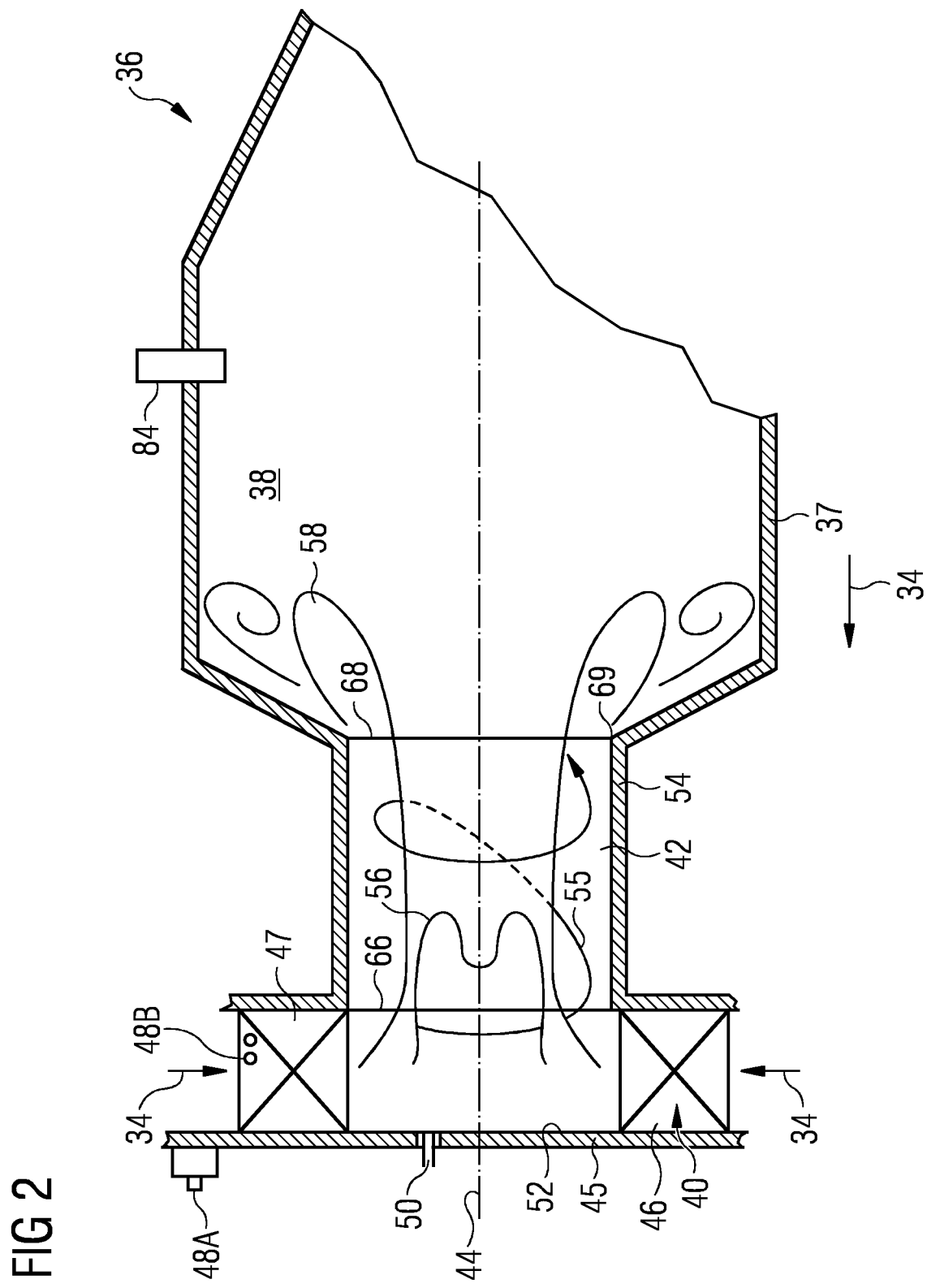
FIG. 2 is a schematic section through a combustor of the combustion system of the gas turbine and is in accordance with the present invention.

FIG. 2 is a cross-section through part of one combustor 36 of a group of combustors of the turbine engine 10 described above and in accordance with the present invention. The radial swirler 40 comprises the annular array of vanes 46, arranged about the combustor axis 44, and which are angled tangentially relative to the combustor axis 44 to impart a swirling flow 55 of mixing air and fuel as is well known. The swirling flow 55 rotates about the combustor axis 44 and flows in a general left to right direction as seen in FIG. 2. The swirler vanes 46 form an array of mixing channels or swirler slots 47 between each consecutive swirler vane 46. The swirler 40 further comprises main fuel injectors 48A, 48B for injecting a main fuel and pilot fuel injectors 50 for injecting a pilot fuel. The swirler 40 comprises the base plate 45 which has a pilot surface 52 that faces the pre-chamber 42 and bounds the pre-chamber's upstream axial extent. The pre-chamber 42 is further defined by an annular wall 54 arranged symmetrically about the combustor axis 44. The pre-chamber 42 has an inlet 66 and an outlet 68. The outlet 68 forms or is at a lip 69 of the pre-chamber 42 and defines where the pre-chamber 42 terminates. The pre-chamber's 42 annular wall 54 is then succeeded by the generally annular wall 37 of the main combustion chamber 38. From the lip 69 and downstream the generally annular wall 37 is divergent and opens to define the main combustion chamber 38. The main combustion chamber 38 has a greater cross-sectional area than that of the pre-chamber 42.

There are two distinct fuel/air mixtures and subsequently combustion flames in the combustion chamber 38; a pilot flame 56 is derived from the pilot fuel/air mixture and the main flame 58 is derived from the main fuel/air mixture. The lines indicated 56 and 58 show the flame front and the respective flames continue downstream of the flame front. The pilot flame 56 and the main flame 58 are distinct from one another because of the location of the respective fuel injection points within the air flow 34 in or near to the mixing channel(s) 47. The main fuel injectors 48A, 48B inject main fuel into the swirler slot or mixing channel 47 further away from, i.e. radially outwardly of, the combustor axis 44 than the pilot fuel injector(s) 50. Thus, the respective fuel/air mixtures form substantially different flame regions with the pilot flame 56 generally radially inward of the main flame 58. In this example, the pilot fuel injector(s) 50 is located through the base plate 45 and which is radially inwardly of the swirler 40.

Radial swirlers, as in the case here, have or can be defined as having, a swirl number SN. The radial swirler 40 described above has a SN in the region 0.5 to 0.8. The swirl number can be calculated as is well known in the art, suffice to say here, that the swirl number can be defined by a relationship between the fluxes of angular and linear momentum of the fuel/air mixture. That is to say, the angular momentum relates to rotational velocity about the combustor axis 44 and the linear momentum relates to the velocity in the axial direction along the combustor axis 44. Thus, the SN is defined herein as the ratio of tangential momentum to axial momentum of the fluid or fuel/air mixture.

Figure 3:
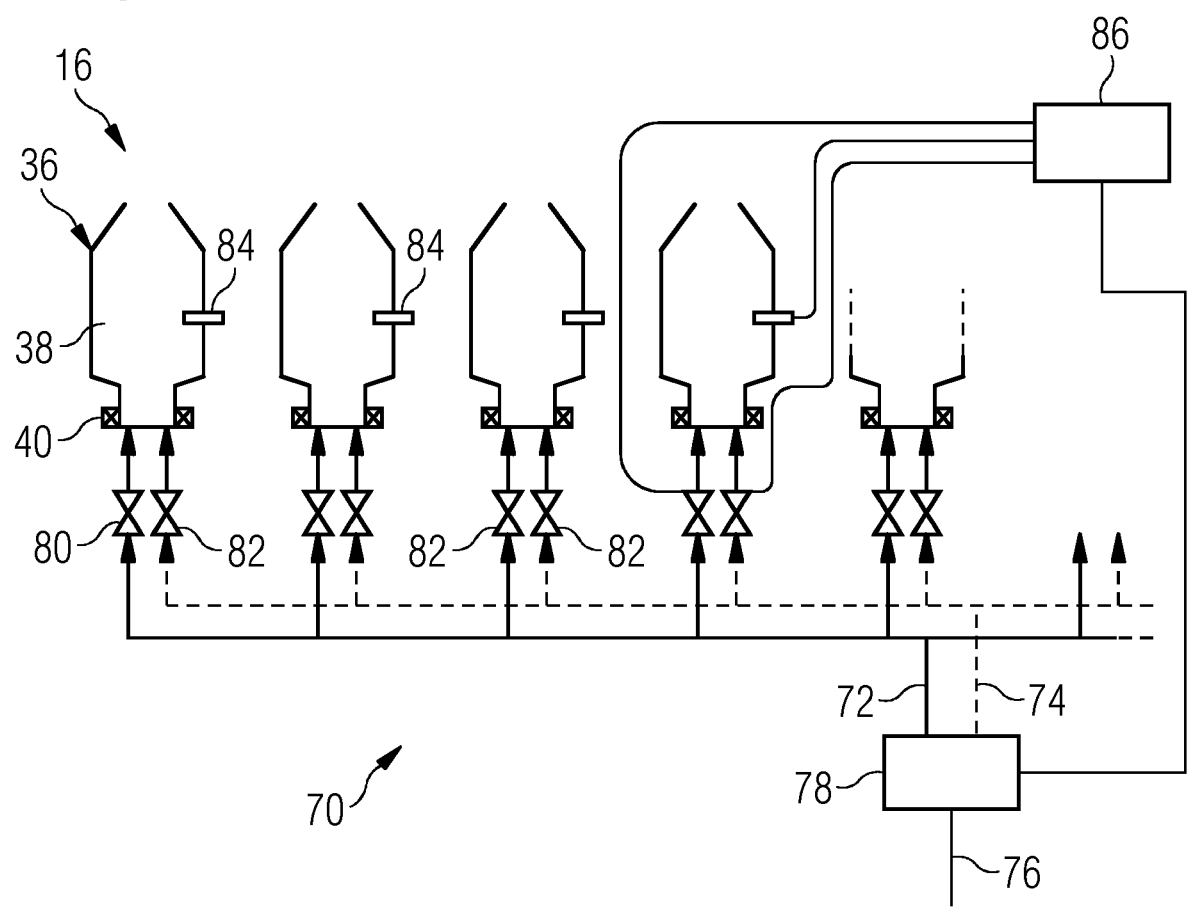
FIG. 3 is a schematic illustration of a fuel supply system for the combustion system of the gas turbine, including a controller which is programmed to control the combustor(s) in accordance with the present invention.

FIG. 3 is a schematic illustration of a fuel supply arrangement 70 for supplying fuel to the combustors of the combustion system. The fuel supply arrangement 70 comprises a main fuel supply 72, a pilot fuel supply 74, a total fuel supply 76, a main fuel valve 80, a pilot fuel valve 82, a combustion monitor 84 and a controller 86. The controller 86 is part of the engine's electronic control unit (ECU), but it may be a separate component. The controller 86 comprises software programming which is a part of the overall engine control software. The controller 86 is connected to the main fuel valve 80, the pilot fuel valve 82 and the combustion monitor 84 of each combustor 36. The combustion monitor 84 measures combustion instability via dynamic pressure fluctuations. As mentioned, the combustion system 16 has a number of combustors 36, in this case there are 6 combustors 36 spaced evenly around the engine's axis 26. Each combustor 36 has its own main fuel supply 70 controlled by the main fuel valve 80 and pilot fuel supply 72 controlled by the pilot fuel valve 82 and each main and pilot fuel valve 80, 82 is connected to the controller 86 and is controllable by the controller 86. Each combustor 36 has at least one combustion monitor 84 and which are each connected to the controller 36.

The controller 86 is connected to, monitors, and controls a position of the variable guide vanes, a position of a blow-off valve(s) and a position of a bleed valve(s). The position of the variable guide vanes, the position of the blow-off valve(s) and the position of the bleed valve(s) are continuously monitored by the controller 86. The position of the variable guide vanes, the position of the blow-off valve (s) and the position of the bleed valve(s) are scheduled dependent on the condition of the engine and are generally conventionally operated. The controller 86 is connected to and monitors the rotational speed of the engine and the load demand value on a continual basis. All these parameters are indicative of transient engine condition and a change in the air/fuel ratio in the combustor which can lead to combustion instability. In a preferred embodiment, the control unit 86 is programmed with schedules of demanded positions of the variable guide vane 90, the position of the blow-off valve 92, the position of a bleed valve 94 and the demanded fuel energy input rate, the demanded rotational speed and the load demand value. In another embodiment, the physical positions of the variable guide vanes 90, blow-off valve 92 and bleed valve 94 may be used. However, using the demanded positions provides earlier intervention by the transient active pilot split offset than using a feedback from the monitored positions.

During operation of the combustion system 16 the combustion monitor 84 monitors the pressure fluctuations in the combustion chamber 38 and transmits a reading of the pressure fluctuations to the controller 86. The combustion monitor 84 continuously transmit to the controller 86.

On engine start-up, fuel is supplied to the pilot injectors 50 in one or more of the combustors 36 and the fuel is ignited. The pilot fuel valve 82 is open. The main fuel valve 80 is closed. When the pilot flame 56 is established in any one of the combustors 36, and there is a demand to increase engine power, fuel is then supplied to the main injectors 48A, 48B and the main fuel valve 80 is opened an amount representative of the demanded power output. When the main flame 58 is established in each combustor 36 the controller 86 determines the status of combustion stability in each combustor 36 and the combustion stability<a predetermined value, the pilot fuel valve 82 for that combustor 36 begins to close and reduce the pilot fuel supply. The total fuel supply 76 remains constant or has negligible change, therefore what would have been the pilot fuel supply quantity is now directed into the main fuel supply and is injected through the main fuel injectors 48A, 48B. Thus, at a constant demanded output of either the combustion system 16 or the gas turbine engine 10, the total fuel supplied and burned in the combustion chamber 38 also remains constant or very close to constant when the pilot fuel supply 72 is decreased to zero. Each combustion monitor 84 monitors the pressure fluctuations in each combustion chamber 38 and transmits a reading to the controller 86. Alternatively, the combustion monitor 84 monitors the pressure fluctuations (combustor stability) in the plenum 35, immediately external to the combustion chamber 38. The controller 86 is programmed to adjust the pilot fuel supply 74, by opening or closing the pilot fuel valves 82, partly dependent on the pressure fluctuations for each combustor 36. Here, any one or more of the combustors 36 may have its pilot fuel valve 82 closed or open depending on its combustion instability. Therefore, any one or more of the combustors 36 may be operating solely on its main fuel supply and a main flame 58 and other combustors 36 may be operating with a pilot fuel supply 72 and a main fuel supply with corresponding pilot and main flames 56, 58 present. However, it is possible that a group of combustors 36 or all of the combustors 36 may have the pilot fuel supply 72 closed or open depending on any one or more of the combustors' combustion stability. For example, when the pilot fuel valves are closed on all of the group of combustors 36 and a combustion instability threshold or value is reached, all of the group's pilot fuel valves 82 are opened.

The steady state condition of the gas turbine engine is where the demanded load is substantially constant for a period of time such that there is a substantially constant total fuel supply to the combustor. A transient state condition of the gas turbine engine occurs when the demanded power output or load changes, for example by at least 1% of the engine's maximum power output or load, and the total fuel supplied to the combustor changes accordingly.

Figure 4B:
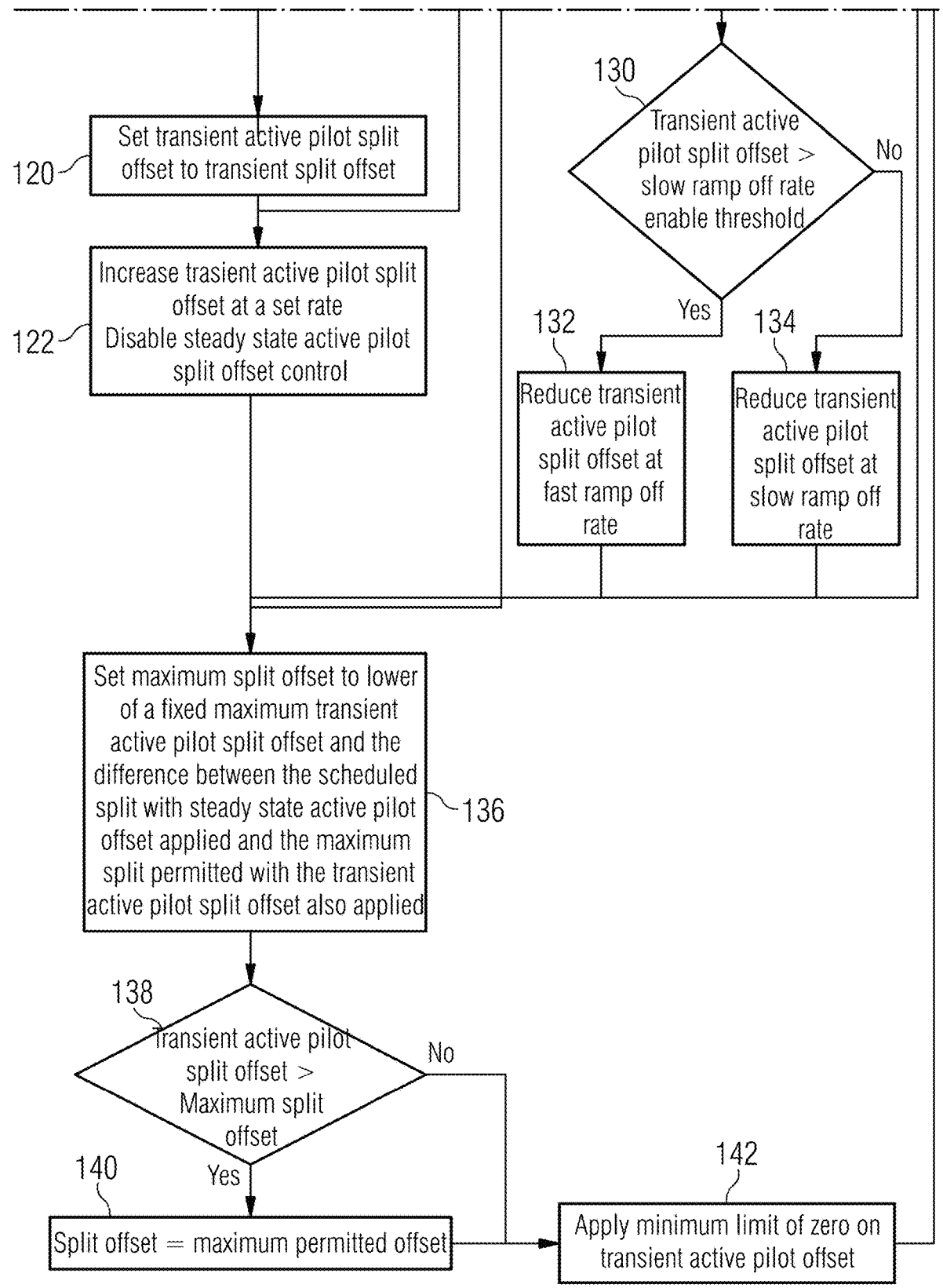
FIG. 4 is a flow diagram showing the method of controlling the combustor(s) of the gas turbine engine and is in accordance with the present invention.

Referring now to FIG. 4 which shows a flow diagram of the method of controlling the combustor 100 in accordance with the present invention. As mentioned in the preamble, the existing active pilot control, as disclosed in EP1974139B1, is a steady state offset or trim on the schedule of pilot fuel splits dependent on the engine load and designed to cater for variation in ambient or site conditions or manufacturing tolerances. The active pilot control does not sufficiently control the pilot/main fuel flows during load transients. The active pilot control uses the temperature of the combustor, but because the temperature is not stable and could even be adjusting the wrong pilot/main fuel split due to a lag in temperature response to a change in load. This means it takes longer for the pilot/main fuel split to recover to where it should be after the load transient and leading to increased emissions for longer. In combination with the active pilot control, as disclosed in EP1974139B1, the control arrangement of EP2486328B1 may be operational such that the control arrangement varies the fuel supplied, i.e. the pilot fuel split, to a combustor via a signal based on temperature and pressure of the combustor and on progress over time. The control arrangement is further configured such that the signal also represents a load information being indicative of a load of the combustion apparatus. The control arrangement is intended to maintain the temperature of the combustor below a predetermined maximum temperature limit and to keep the pressure variations within the combustion volume below a predetermined maximum pressure variation limit, while keeping the total fuel supply in the fuel supply line to the apparatus substantially constant. The offset applied to the pilot fuel split in EP2486328B1 is herein referred to as the 'intelligent control offset'. Both the steady state active pilot split offset control of EP1974139B1 and the intelligent control offset of EP2486328B1 are herein referred to as the 'steady state active pilot split offset'. Thus, the steady state active pilot split offset may be the active pilot offset and/or the intelligent control offset as applied to the pilot fuel split.

The present invention overrides or disables adjustment of the steady state offset, as applied by either the steady state active pilot split offset control of EP1974139B1 or the intelligent control arrangement of EP2486328B1, with a transient split offset to the scheduled pilot fuel split during transient engine conditions and when a threshold value of combustion instability is exceeded. When steady state engine conditions are apparent, or combustion instability is below the threshold value the transient active pilot split offset to the scheduled pilot fuel split is overridden or disabled such that the steady state active pilot split offset control is enabled.

The "steady state active pilot offset" is the steady state offset applied to the scheduled pilot fuel split for the existing active pilot control of EP1974139B1.

The "transient split offset" is the offset applied in addition to the steady state offset for the transient condition of the gas turbine engine as a pro-active measure to prevent combustion instability.

The "transient active pilot split offset" is the offset applied in addition to the steady state active pilot split offset as a re-active measure to reduce combustion instability when combustion instability is detected after having applied the transient split offset above and when above a set threshold of combustion instability where intervention by existing steady state active pilot split offset control is no longer valid or desired.

The present method of controlling the combustor is generally indicated 100. Initially, as shown on FIG. 4 the method comprises the steps of supplying a total fuel quantity to the combustor and applying the steady state active pilot split offset to the scheduled pilot fuel split when exceeding a predetermined temperature of the combustor and/or exceeding a predetermined combustion instability. The total fuel quantity is split into the pilot fuel quantity and the main fuel quantity by virtue of controlling the pilot fuel split. The pilot fuel split is the percentage of pilot fuel quantity of the total fuel quantity at any point in time.

The predetermined temperature is that of the combustor and is indicative of the state of the combustion flame. The predetermined value of combustion instability is in range 15-50 mbar with a typical value in the range 24-34 mbar. These values are absolute values. The predetermined value may be at a predefined frequency of combustion pressure fluctuations. The predetermined value is that within the combustion chamber 38 but may be a related value if monitored outside the combustion chamber such as in the plenum 35.

The method 100 monitors the conditions of the gas turbine engine that influence the air/fuel ratio in the combustor. As described above, these conditions may be any one or more of the positions of the variable guide vanes, the position of a blow-off valve(s), the position of a bleed valve(s), the rotational speed demand of the engine and the load demand value or a fuel energy input rate which may be calculated from the calorific value of the fuel and the total fuel flow demanded. The monitoring is continual and in real time.

In steps 110 and 112, when the condition of the gas turbine engine is indicative of a transient condition and when combustion instability exceeds an instability threshold value, the transient active pilot control is enabled. A transient condition is indicated by a transient split offset being applied for a number of conditions of the gas turbine engine that could affect the air to fuel split in the combustor and the transient split offset exceeding a transient split offset threshold for steady state active pilot control. The transient condition of the gas turbine engine could be indicated by any one or more of:

the position of the variable guide vanes is opening, that is the variable guide vanes are in a more open position and the variable guide vane 'demand' is decreasing, the position of a blow-off valve is closing, that is the blow-off valve is in a more closed position and the blow-off valve demand is decreasing, the position of the bleed valve is closing, that is the bleed valve is in a more closed position and the bleed valve demand is decreasing, a fuel energy input rate, that is the fuel energy input rate measured in kW/second is decreasing, the rotational speed demand of the engine is decreasing; and the load demand value is decreasing.

The instability threshold value of combustion instability is in the range 15 millibar to 50 millibar with typical value in the range 24 millibar to 34 millibar. Combustion instability is the fluctuation in pressure within the combustion chamber, although it could be measured outside the combustion chamber and in which case the pressure fluctuation values outside the combustion chamber are relative to the pressure fluctuation within the combustion chamber as would be apparent to the skilled person.

The transient split offset threshold for enabling transient active pilot control is in the range 0.01% to 5% with a preferable value in the range 0.01% to 2%. For example, the scheduled pilot fuel split with steady state offset applied may be 25%; if the transient split offset threshold is, say, 2%; therefore, the threshold at which the transient active pilot control is enabled is a pilot fuel split of 27%.

The scheduled pilot fuel split has a practical range 2% to 80%, although typically most engines will have a scheduled pilot fuel split in the range 5% to 25%, and most frequent operation is in the range 5% to 15%. The steady state active pilot split offset is in the range −5% to 5%, preferably in the range −2% to 2%. The transient active pilot split offset is in the range 1% to 25% and most commonly in the range 2% to 10%. In extreme cases the transient active pilot split offset may be in the range 0.01% to 25%. Where the transient active pilot split offset is applied to the scheduled pilot fuel split the pilot fuel split may be in the range 2% to 80%, but most commonly in the range 5% to 15%.

After the transient active pilot control is enabled there is a delay in steps 114 and 116 to confirm that the instability is genuine and sustained, thereby requiring additional pilot fuel split to be applied. No intervention is required by the active pilot split control if the instability falls back below the instability threshold within this delay. The confirmation delay is in the range 0.1-10 millibar-seconds, preferably 4-5 millibar-seconds; the confirmation delay being an inverse error-time delay where the delay reduces with increasing overshoot beyond the threshold value to respond sooner to greater instability.

When the confirmation delay is complete in step 116, the transient active pilot split offset is initialised to the current transient split offset applied for the transient condition in step 120 if the transient active pilot split offset is below this in step 118.

The transient active pilot split offset is then increased at a fixed rate in step 122 while the combustion instability remains above the threshold in step 112, thereby increasing the pilot fuel split to improve combustion stability. This fixed rate is in the range 0.1%/s to 5%/s and with a preferred value in the range 0.5%/s to 1%/s. At the same time, the control of the steady state active pilot split offset is disabled in step 122.

Having detected a transient engine condition, the transient active pilot split offset is set so that the total pilot fuel split is very quickly adjusted to the correct value to reduce the effect of transient combustion instability and subsequent vibration of flame failure this may cause.

Once the combustion instability is no longer above the threshold for intervention by the transient active pilot split offset in step 112 the method 100 waits for a set delay in steps 126 and 128 to allow time for combustion to acceptably stabilise before the transient active pilot split offset is reduced in order to return to normal steady state operation. This delay before reducing the transient active pilot split offset is in the range 0.1 to 5 seconds and typically is in the range 2 to 3 seconds.

Once the set delay is complete in step 128 the transient active pilot split offset is gradually reduced to zero to resume normal steady state operation of the gas turbine engine 10.

In step 130, this gradual reduction to zero of the transient active pilot split offset may be made at a fast ramp off rate (Step 132) or a slow ramp off rate (Step 134) as determined by whether the transient active pilot split offset is greater than a slow ramp off rate enable threshold. The slow ramp off rate enable threshold has a value in the range 1% to 10% of the total fuel quantity with a typical value in the range 2% to 5%, for example 2.5% of the total fuel quantity.

In step 132, where the transient active pilot split offset is greater than the slow ramp off rate enable threshold, the fast ramp off rate is in the range 0.1%/s to 5%/s with typical value in the range 0.5%/s to 1%/s.

In step 134, where the transient active pilot split offset is less than or equal to the slow ramp off rate enable threshold, the slow ramp off rate is in the range 0.01%/s to 1%/s with a typical value in the range 0.2%/s to 0.3%/s.

The slow ramp off threshold for any gas turbine engine may be set during engine commissioning and for the particular characteristics of any single engine and may be adjusted in-service.

Once the transient active pilot split offset is reduced below the maximum offset for steady state operation in step 110 by the reduction that occurs in steps 132 or 134, the steady state active pilot split offset control is re-enabled in step 124.

In Step 136, a maximum split offset is determined at any instant for any split offset to be limited. The maximum split offset is the lower of a) a predetermined or fixed maximum of the transient active pilot split offset, and which is in the range 10% to 25%, with a typical value in the range 15% to 20% and b) a maximum pilot fuel split offset determined by the difference between the current scheduled split with the steady state active pilot split offset applied and a set maximum pilot split permitted with the transient active pilot split offset also applied and which is in the range 40% to 85% with a typical value in the range 60% to 65%.

In step 138, the transient active pilot split offset is compared to the maximum split offset.

In step 140, the maximum split offset is then applied to the transient active pilot split offset if the transient active pilot split offset is above the maximum split offset in step 138. The determination and application of the maximum split offset has the effect of reducing the maximum value permitted for the transient active pilot split offset at higher scheduled pilot fuel splits where the transient pilot fuel split offset as applied to the scheduled pilot fuel split has less effect. The higher scheduled pilot fuel splits occur at lower gas turbine engine outputs, for example, below 40% maximum engine output power.

The scheduled pilot fuel split has an absolute minimum and maximum range 2% to 80%, mostly the scheduled pilot fuel split is in the range 5% to 25%, with the most frequent range being 5% to 15%.

As this control should never apply a negative split pilot fuel offset a minimum limit of zero is applied to the transient active pilot split offset in step 142.

The method 100 is continuously repeated, starting at 110 and beginning again once step 142 is completed.

All the features disclosed in this specification (including any accompanying claims, abstract and drawings), and/or all the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of controlling a combustor of a gas turbine engine, the method comprising:

supplying a total fuel quantity to the combustor dependent on a load of the gas turbine engine, the total fuel quantity is split into a pilot fuel quantity and a main fuel quantity via a scheduled pilot fuel split, the scheduled pilot fuel split is the percentage of the pilot fuel quantity to the total fuel quantity, monitoring combustion instability, detecting that a predetermined temperature of the combustor is exceeded and/or that a predetermined value of combustion instability is exceeded, applying a steady state active pilot split offset to the scheduled pilot fuel split to create a steady state pilot fuel split, the steady state active pilot split offset being adjusted automatically in response to the predetermined temperature of the combustor being exceeded and/or the predetermined value of combustion instability being exceeded, monitoring a condition of the gas turbine engine that influences an air/fuel ratio in the combustor, detecting that the condition of the gas turbine engine is indicative of a transient condition and that a threshold value of combustion instability is exceeded, disabling adjustment of the steady state active pilot split offset in response to detecting that the condition of the gas turbine engine is indicative of the transient condition and that the threshold value of combustion instability is exceeded, and applying a transient active pilot split offset to the steady state pilot fuel split while maintaining the total fuel quantity being supplied at any point in time, the transient active pilot split offset and the steady state active pilot split offset result in a total split offset, the total split offset being greater than the steady state active pilot split offset, and a rate of change of the transient active pilot split offset is faster than a rate of change of the steady state active pilot split offset.

2. The method as claimed in claim 1, wherein
when the condition of the gas turbine engine is indicative of a steady-state condition, or when combustion instability is below the predetermined value of combustion instability, the transient active pilot split offset reduces to zero and adjustment of the steady state active pilot split offset is re-enabled to adjust the scheduled pilot fuel split while maintaining the total fuel quantity being supplied at any point in time.

3. The method as claimed in claim 1, wherein
the condition of the gas turbine engine that influences the air/fuel ratio in the combustor is any one or more of:
a position of a variable guide vane,
a position of a blow-off valve,
a position of a bleed valve,
a fuel energy input rate,
a rotational speed demand of the gas turbine engine, and
a load demand value.

4. The method as claimed in claim 1, wherein
the scheduled pilot fuel split with the steady state active pilot split offset and/or the transient active pilot split offset applied has a maximum value in a range from 2% to 85%.

5. The method as claimed in claim 1, wherein
the scheduled pilot fuel split has a value in a range from 2% to 80%.

6. The method as claimed in claim 1, wherein
the steady state active pilot split offset has a value in a range from −5% to 5%.

7. The method as claimed in claim 1, wherein
the transient active pilot split offset has a value, when combustion instability is above the threshold value, in a range from 0.01% to 25%.

8. The method as claimed in claim 1, wherein
during the step of applying the transient active pilot split offset to the scheduled pilot fuel split while maintaining the total fuel quantity being supplied at any point in time, the transient active pilot split offset causes a total pilot fuel split to the combustor to be in a range from 2% to 80%.

9. The method as claimed in claim 1, wherein
the rate of change of the transient active pilot split offset is in a range from 0.1% to 5% per second.

10. The method as claimed in claim 1, wherein
when combustion instability exceeds the threshold value, there is a confirmation delay before disabling adjustment of the steady state active pilot split offset and applying the transient active pilot split offset to the scheduled pilot fuel split while maintaining the total fuel quantity being supplied at any point in time,
the confirmation delay has a value in a range from 0.1 millibar-seconds to 10 millibar-seconds, and
wherein the confirmation delay is an inverse error-time delay wherein the confirmation delay reduces with increasing overshoot beyond the threshold value.

11. The method as claimed in claim 1, wherein
the threshold value for combustion instability is an amplitude of the fluctuations in pressure in a set frequency band of combustion, wherein the threshold value for combustion instability has a value in a range from 15 millibars to 50 millibars.

12. The method as claimed in claim 1, further comprising
setting a ramp off delay before reducing the transient active pilot split offset when the combustion instability is below the threshold value.

13. The method as claimed in claim 12, wherein
the ramp off delay has a value in a range from 0.1 second to 5 seconds.

14. The method as claimed in claim 1, wherein the method further comprises
reducing the transient active pilot split offset at a fast ramp off rate while the transient active pilot fuel split remains above a slow ramp off rate enable threshold, and/or
reducing the transient active pilot split offset at a slow ramp off rate when the transient active pilot split offset is below the slow ramp off rate enable threshold.

15. The method as claimed in claim 14, wherein
the fast ramp off rate has a first value in a range from 0.1% per second to 5% per second,
the slow ramp off rate has a second value in a range from 0.01% per second to 1% per second, and
the slow ramp off rate enable threshold has a third value in a range from 1% to 10% above the steady state active pilot fuel split.

16. The method as claimed in claim 1, further comprising
enabling the steady state active pilot split when both the transient active pilot split offset and a transient split offset for the transient condition are no longer above a maximum offset for the steady state active pilot split.

17. The method as claimed in claim 4, wherein
the maximum value is in a range from 40% to 85%.

18. The method as claimed in claim 4, wherein
the maximum value in a range from 60% to 65%.

19. The method as claimed in claim 5, wherein the value is in a range from 5% to 25%.

20. The method as claimed in claim 5, wherein the value is in a range from 5% to 15%.

21. The method as claimed in claim 6, wherein the value is in a range from −2% to 2%.

22. The method as claimed in claim 7, wherein the value is in a range from 1% to 25%.

23. The method as claimed in claim 7, wherein the value is in a range from 2% to 10%.

24. The method as claimed in claim 8, wherein the total pilot fuel split to the combustor is in a range from 5% to 15%.

25. The method as claimed in claim 9, wherein the rate of change of the transient active pilot split offset is in a range from 0.5% to 1.0% per second.

26. The method as claimed in claim 10, wherein the value is in a range from 4 millibar-seconds to 5 millibar-seconds.

27. The method as claimed in claim 11, wherein the value is in a range from 24 millibars to 34 millibars.

28. The method as claimed in claim 13, wherein the value is in a range from 2 seconds to 3 seconds.

29. The method as claimed in claim 15, wherein
the first value is in a range from 0.5% per second to 1.0% per second,
the second value is in a range from 0.2% per second to 0.3% per second, and
the third value is in a range from 2% to 5% above the steady state active pilot fuel split.

30. A method of controlling a combustor of a gas turbine engine, the method comprising:
- supplying a total fuel quantity to the combustor dependent on a load of the gas turbine engine, the total fuel quantity is split into a pilot fuel quantity and a main fuel quantity via a scheduled pilot fuel split,
- the scheduled pilot fuel split is the percentage of the pilot fuel quantity to the total fuel quantity,
- monitoring combustion instability,
- monitoring a condition of the gas turbine engine that influences an air/fuel ratio in the combustor,
- applying a steady state active pilot split offset, using a controller, to the scheduled pilot fuel split to create a steady state pilot fuel split, the controller configured to automatically adjust the steady state active pilot split offset when a predetermined temperature of the combustor is exceeded and/or a predetermined value of combustion instability is exceeded, the controller being further configured to disable adjustment of the steady state active pilot split offset when the condition of the gas turbine engine is indicative of a transient condition and when a threshold value of combustion instability is exceeded,
- applying a transient active pilot split offset to the steady state pilot fuel split while maintaining the total fuel quantity being supplied at any point in time, the transient active pilot split offset and the steady state active pilot split offset result in a total split offset, the total split offset being greater than the steady state active pilot split offset, and
- a rate of change of the transient active pilot split offset is faster than a rate of change of the steady state active pilot split offset.

31. The method as claimed in claim 30, wherein
when the condition of the gas turbine engine is indicative of a steady-state condition, or when combustion instability is below the predetermined value of combustion instability, the transient active pilot split offset reduces to zero and adjustment of the steady state active pilot split offset is re-enabled to adjust the scheduled pilot fuel split while maintaining the total fuel quantity being supplied at any point in time.

32. The method as claimed in claim 30, wherein
the condition of the gas turbine engine that influences the air/fuel ratio in the combustor is any one or more of:
- a position of a variable guide vane,
- a position of a blow-off valve,
- a position of a bleed valve,
- a fuel energy input rate,
- a rotational speed demand of the gas turbine engine, and
- a load demand value.

* * * * *